Patented June 9, 1936

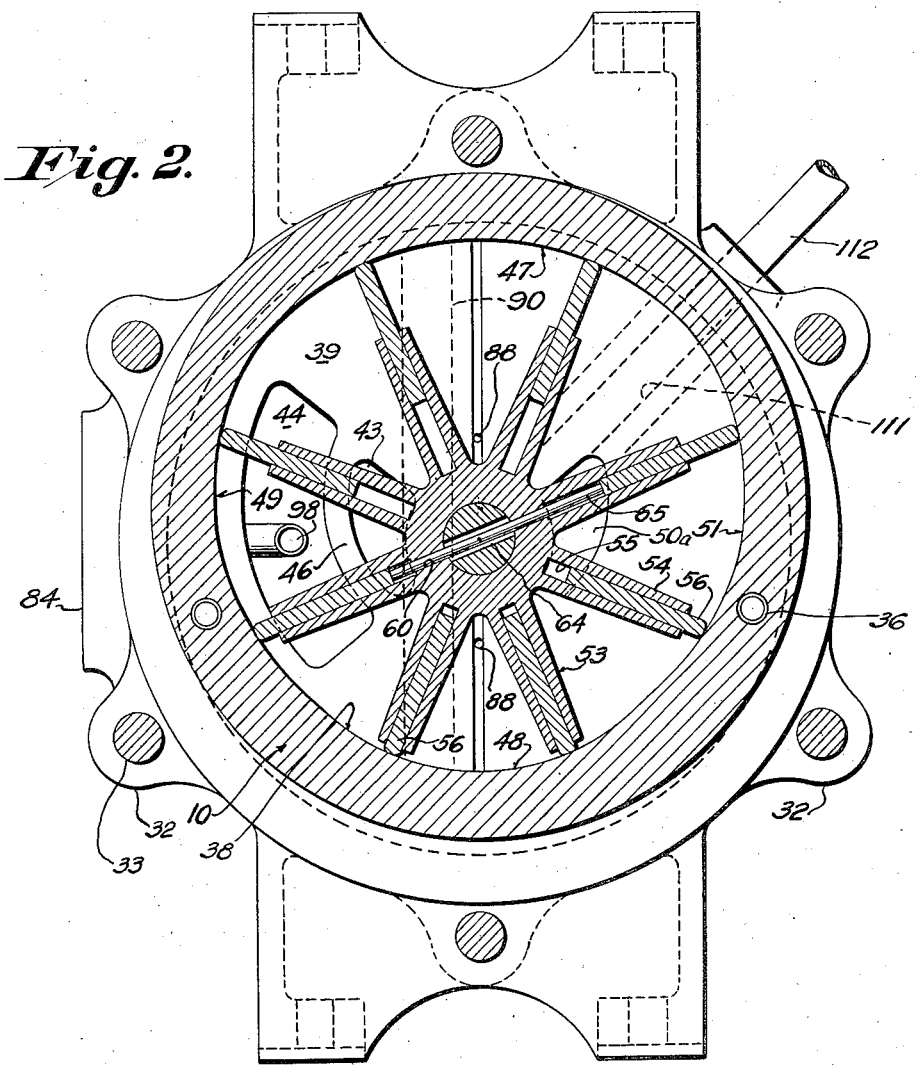
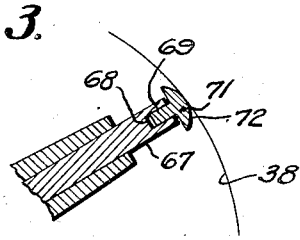

2,043,963

UNITED STATES PATENT OFFICE 2,043,963

FLUID METER

Porter S. Morgan, New York, N. Y., assignor to Liberty Share Corporation, Buffalo, N. Y.

Application June 14, 1934, Serial No. 730,597

2 Claims. (Cl. 73—253)

This invention relates to improvements in fluid meters of the type disclosed in my copending application Serial No. 615,166, filed June 3, 1932.

The invention contemplates the provision of a novel structural formation of a metering chamber to obtain the accurate fitting of a fabricated structure, with a view both to permit the possibilities of mass production on an economical scale and to protect the parts from operating and assembling strains.

The invention also resides in an improved device for preventing leakage across the metering elements in the form of a diaphragm controlled valve.

These features, together with other structural improvements, are more specifically set forth in the accompanying specification and drawings, wherein:

Fig. 2 is a section on the line 2—2 of Fig. 1; and

Fig. 3 is a cross section through a blade and shoe structure of an alternate type.

General structure

Figure 1:
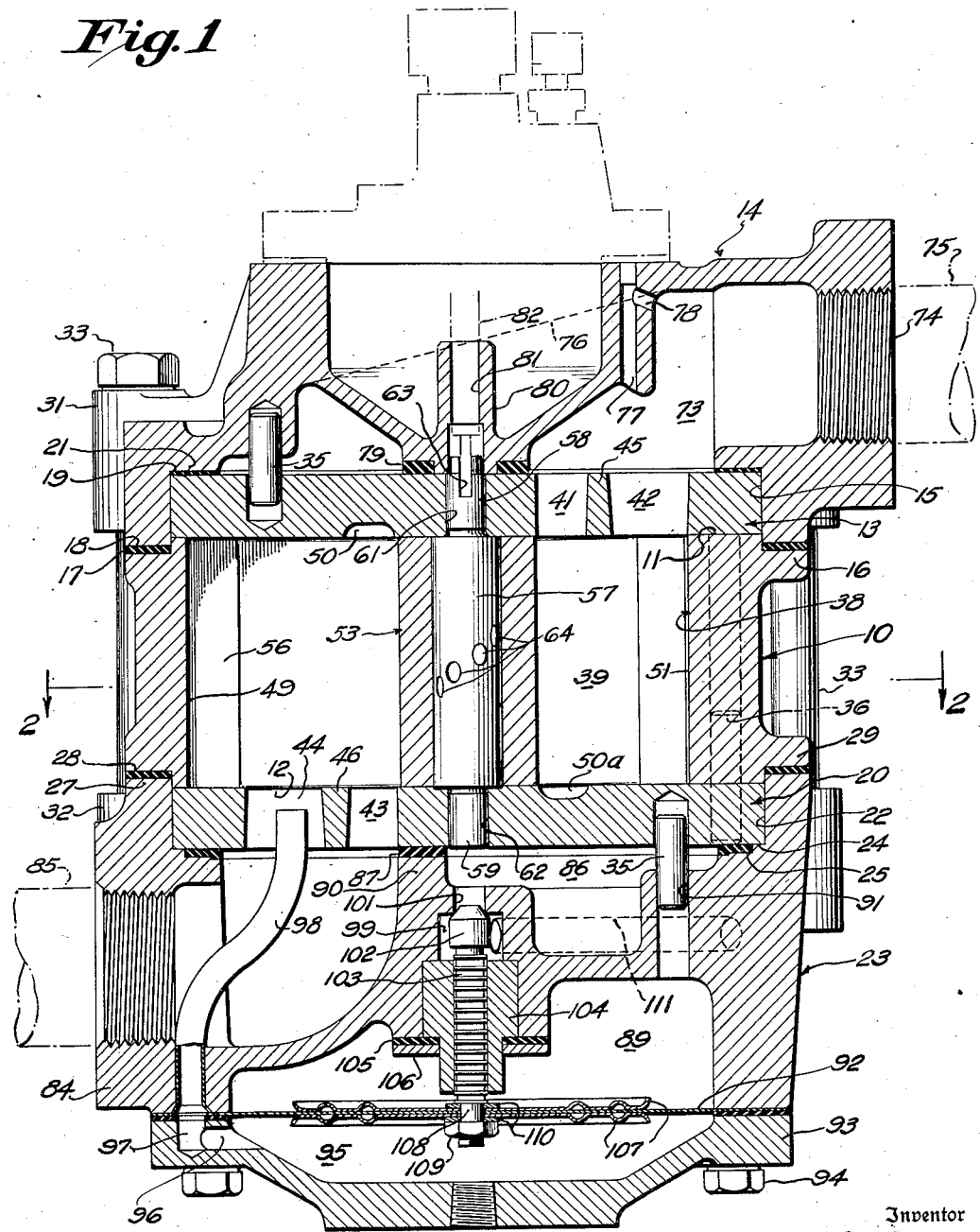
Fig. 1 is a vertical section through the metering device.

The metering device includes a casing fabricated of a central cylindrical member 10 having parallel faces 11 and 12 on which are disposed circular plates 13 and 20, and which form a chamber within the member 10. An upper head 14 is formed with an internal cylindrical portion 15 which encloses the upper plate 13 and the adjacent extremity of the member 10. The member 10 is formed with a radial flange 16 and it receives a gasket 17 which is engaged by the face 18 of the upper head. A second gasket 19 is interposed between the plate 13 and the end wall 21 of the portion 15.

Similarly, the lower plate 20 is received in a cylindrical portion 22 of a lower head 23 and it abuts a shoulder 24 formed in the head, and this joint is sealed by a gasket 25. The face 27 of the lower head engages a gasket 28 which is mounted on a second flange 29 formed on the member 10.

The heads 14 and 23 are formed with aligned lugs 31 and 32 respectively, the former containing holes for receiving screws 33 and the latter containing tapped holes for receiving the tapped extremities of the screws. Dowels 35, engaged in the heads and plates, and dowels 36, connecting the member 10 and the plates, serve to locate the parts for assembly.

It will be observed that when the heads are drawn toward each other, the interposed plate and cylinder structures are firmly clamped together by the pressure exerted through the gasket connections. This method of connecting the parts insures the clamping of the plates and cylinder, regardless of inequalities in the tensioning of the screws 33, and it furthermore protects these parts from distortion under such conditions.

Rotor chamber

The inner wall 38 of the member 10 is roughly circular in shape and eccentric to the axis of this member. The plates 13 and 20 cooperate to form a rotor chamber 39 within this member and they are formed with pairs of ports 41 and 42, and 43 and 44, respectively, which pairs are similar, but disposed on opposite sides of the horizontal axis as viewed in Fig. 2. Each pair of ports together forms a segmental opening divided by a spiral rib, herein indicated by the numerals 45 and 46, in the plates 13 and 20 respectively.

In a more specific aspect, it is preferred that the wall 38 be formed to have a constant diameter at all angles of rotation. A wall of this character may be constructed by forming diametrically opposed portions of equal arcs as radial portions, to provide a major arcuate surface 47 and a minor arcuate surface 48 of a lesser radius, and by connecting such surfaces with curved surfaces 49 and 51, which are formed as complementary harmonic curves of a type suitable both to provide for a constant rate of change of curvature and to retain the diametrical characteristics above referred to.

The rotor

The rotor is formed of a spider 53 having a plurality of arms 54 which contain radial slots 55 adapted to receive rectilinear vanes or blades 56. The hub of the spider is formed with an axial hole into which is pressed a spindle 57 having axle portions 58 and 59 projecting therefrom and received in bearings 61 and 62 formed in the plates 13 and 20 respectively. The upper axle portion is formed with a slot 63 serving as a connection with a registering mechanism or the like. The spider and spindle are drilled, as indicated by the numerals 60 and 64, to receive rods 65 which connect the opposed pairs of blades 56. These rods and the blades are proportioned so that the sum of their diametrical dimensions nearly equals the diameter of the wall 38, and, as a result, when the rotor is rotated, the outer edges of the blades are always retained in sliding contact with the wall 38.

In Fig. 3 there is shown a blade 67 which may, if desired, be substituted for the described blade 56 where extreme accuracy of contact is required. The extremity of the blade 67 is formed with a slot 68 which receives, with some clearance, a gib portion 69 of a shoe 71. The extremity of the shoe is formed with a curved head 72 for sliding engagement with the wall 38. Inasmuch as the pressures on one face of the vane are greater than on the opposite face, and there is a centrifugal force acting on the shoes, it follows that the shoe will be constantly urged into contact with the wall 38, thereby preventing excessive leakage between the various pockets formed by the vanes.

The upper and lower plates 13 and 20 are each provided with a segmental pocket, designated as 50 and 50a respectively, to receive any liquid placed under pressure by the movement of the blades 56, thereby preventing any tendency to bind during operation.

*The upper head*

The upper head 14 contains an open input chamber 73, which is closed by the underlying plate 13, and a communicating radial fitting 74 which receives a supply pipe 75 leading to a pump or other source of liquid supply. It will be observed that the chamber is formed with an angular end wall 76 which insures a smooth flow of liquid through the input ports 41 and 42, and which additionally provides that any substantial air volume trapped in the rotor chamber may rise to a high point in the chamber 73 during inoperative periods. Communicating drilled holes 77 and 78 form an injector in the head 14, wherein air trapped in the upper portion of the chamber 73 is drawn through the vertical hole 77, and thence through the ports 41 and 42 in a finely divided state, in which condition it may be successfully carried with the liquid stream through the output ports 43 and 44.

The head 14 is also formed with a central hub 80 which engages the plate 13 in a leakproof fit through the provision of a gasket 79. This hub contains an axial bearing 81 for receiving a driven shaft 82 of a mechanism leading to any suitable device for registering the movement of the rotor.

*Pressure equalizing device*

The lower head 23 is formed with an outlet fitting 84, which receives the discharged liquid from the ports 43 and 44 of the plate 20 and directs it into a discharge conduit 85. This head is also utilized to contain a device for obtaining the equalization of pressures in the outlet conduit and certain portions of the metering chamber, and it is formed with a chamber 86, located below the plate 20 and separated from the fitting 84 by a diametrically disposed gasket 87 and a dividing wall 90. This chamber communicates with portions of the overlying rotor chamber 39 intermediate the pairs of ports thereof through holes 88 drilled in the plate 20. A second chamber 89 is formed in the face of the head 23, and it communicates with the chamber 86 through a restricted passage 91 around the dowel 35.

A diaphragm 92 of a flexible material, such as a gasoline-proof fabric, is secured across the open face of the chamber 89 by a cap member 93 and screws 94. The cap member contains a chamber 95 which communicates with the outlet port 44 through drilled hoes 96, 97 in the member 93 and a communicating tube 98 secured in the fitting 84 of the head 23. It will thus be observed that the opposite sides of the diaphragm 92 are respectively subjected to the pressure at the outlet and intermediate portions of the rotor chamber. Due to the restricted passage 91 into the chamber 89, the diaphragm is protected against sudden movement, as would be occasioned by throttling the discharge conduit, or other causes.

A third chamber 99 is formed in the head 23, intermediate the chambers 86 and 89, and it communicates with the former through a valve seat 101. A valve 102 engages the seat 101 and its stem 103 projects axially through a guide insert 104 and to the diaphragm 92. The insert 104 is removably retained in position by a gasket 105 and a superimposed cap 106 secured to the head 23.

To protect the relatively fragile material of the diaphragm, it is reinforced on each face by a disc 107 and a washer 110 which receive the shouldered extremity 108 of the valve stem 103 and which is secured in assembled relation by a nut 109. Upon the opening of the valve, by movement of the diaphragm, liquid from the chamber 86 is introduced into the chamber 99, and thence it is directed through a bleed conduit 111 drilled in the head 23 to an attached pipe 112, which is directed in most instances to the suction side of the supply pump or to a supply reservoir.

The diaphragm 92 is assembled under such degree of tension and is so balanced that it has what might be termed a "negative characteristic". That is to say, the unbalanced weight of the diaphragm is such as to hold, or to tend to hold, the valve 102 at a very slight distance from its seat 101. It has been found that, under comparatively slow rates of flow, the pressures in the chambers 86 and 89 approach very closely to the pressure in the chamber 95, and the differential pressure might be too small, in absolute terms, to operate the valve 101. Accordingly, the diaphragm 92 is given a slight bias tending to open the valve, so that a very small differential pressure will produce the desired degree of valve opening, without, however, affecting the accuracy when the flow is increased.

*Operation*

The introduction of liquid under pressure into the rotor chamber 39 through the ports 41 and 42 causes the movement of the rotor in a counter-clockwise direction of rotation, with the pockets formed by the vanes 56 first receiving a liquid load adjacent the ports 41 and 42, then traversing the major arcuate portion 47 of the chamber, and finally, due to the volume reducing effect of the curved surface 49, discharging fluid through the ports 43 and 44. During this operation, it will be obvious that a considerable pressure drop will be created between the input and output portions of the device, to the effect that, regardless of the mechanical perfection of the fitting of the blades to the wall 38, leakage will take place through the pockets between the ports.

It will be apparent that liquid leaking into the pockets traversing the arcuate surfaces of the rotor chamber will raise the pressure in such pockets, and concurrently cause leakage to the next pocket at the outlet port. This latter leakage is prevented in the present device by withdrawing the leakage or "slippage" volumes from the intermediate pockets of the meter. This is accomplished by opposing the pressures in such pockets and the output side of the meter across the diaphragm 92, which will open the valve 102 and permit the drainage of a sufficient volume of liquid from the intermediate pockets and through the bleed conduit 111 to equalize the pressures between these portions of the metering device.

As a result, the conveyance of unmetered volumes of liquid between the input and output ports will be prevented, and the device will reflect the actual liquid passage on its registering instrumentalities, without recourse to correcting devices which have hitherto been utilized.

It will thus be seen that in the present invention, there are provided various instrumentalities whereby an effective and accurate meter may be made at a low cost and which will maintain its effectiveness during long periods of service. It will also be understood that while the present improvements have been illustrated in one embodiment only, they are susceptible of other applications or modifications within the scope of the following claims.

I claim:

1. A fluid meter comprising a rotor chamber, upper and lower head members closing the ends of said chamber, a rotor disposed in said chamber, an inlet port formed in said upper head for admitting fluid to one part of said chamber and rotor, a discharge port formed in said lower head for receiving fluid from said chamber, said upper head being formed adjacent said inlet port with a conduit spaced from and extending toward said chamber and a second conduit in communication with said first named conduit, said second conduit extending toward said inlet port, whereby air entrapped in said head will be aspirated and dispersed through liquid passing through said chamber.

2. A fluid meter comprising a rotor chamber, a rotor in said chamber, upper and lower heads for said chamber to enclose the same, an inlet port formed in the upper head, an outlet port formed in the lower head on the opposite side of said rotor, a pressure chamber, a diaphragm disposed across said pressure chamber to divide the same into isolated compartments, a valve secured to said diaphragm, a draw-off line in fluid communication with said valve, said valve being in fluid communication with one of said compartments, means for admitting fluid from said rotor chamber to one of said compartments, means for admitting fluid from the discharge port of said lower head to the other of said compartments, said diaphragm being of such weight and under such tension as to hold said valve slightly open when the pressure differential in said compartments reaches a predetermined low value.

PORTER S. MORGAN.